(12) United States Patent
Haack et al.

(10) Patent No.: US 11,187,632 B2
(45) Date of Patent: Nov. 30, 2021

(54) TEST CHAMBER AND METHOD

(71) Applicant: Weiss Umwelttechnik GmbH, Reiskirchen (DE)

(72) Inventors: Christian Haack, Marburg (DE); Bjoern Stroh, Gemuenden (DE); Dennis Reuschel, Giessen (DE)

(73) Assignee: WEISS TECHNIK GMBH, Reiskirchen (DE)

( * ) Notice: Subject to any disclaimer, the term of this patent is extended or adjusted under 35 U.S.C. 154(b) by 93 days.

(21) Appl. No.: 16/442,719

(22) Filed: Jun. 17, 2019

(65) Prior Publication Data

US 2019/0383713 A1 Dec. 19, 2019

(30) Foreign Application Priority Data

Jun. 19, 2018 (EP) .................... 18178625

(51) Int. Cl.
*F25B 5/02* (2006.01)
*G01N 1/42* (2006.01)
*F25B 41/385* (2021.01)

(52) U.S. Cl.
CPC .............. *G01N 1/42* (2013.01); *F25B 5/02* (2013.01); *F25B 41/385* (2021.01)

(58) Field of Classification Search
CPC .............. F25B 5/02; F25B 2400/0403; F25B 2400/0411; F25B 2700/21151; G01N 1/42
See application file for complete search history.

(56) References Cited

U.S. PATENT DOCUMENTS

| | | | |
|---|---|---|---|
| 6,460,355 B1 | 10/2002 | Trieskey | |
| 2002/0148239 A1* | 10/2002 | Trieskey | ................. F25B 40/02 62/79 |
| 2009/0272132 A1* | 11/2009 | Rusignuolo | ........... F25D 29/003 62/77 |
| 2017/0102175 A1* | 4/2017 | Chen | ...................... F25B 49/027 |
| 2018/0217019 A1* | 8/2018 | Furumoto | ............. F25B 25/005 |
| 2019/0078818 A1* | 3/2019 | Khaled | ................. F25B 49/022 |

FOREIGN PATENT DOCUMENTS

| | | |
|---|---|---|
| EP | 0344397 A2 | 12/1989 |
| EP | 3273181 A1 | 1/2018 |
| WO | 2017178275 A1 | 10/2017 |

* cited by examiner

*Primary Examiner* — David J Teitelbaum
(74) *Attorney, Agent, or Firm* — Quarles & Brady LLP

(57) ABSTRACT

A test chamber and a method for conditioning air includes a temperature-insulated test space which can be closed off from the surroundings, and a temperature control device for controlling the temperature of the test space. The temperature control device allows a temperature in a temperature range of −20° C. to +180° C. to be established within the test space, and includes a cooling circuit with a refrigerant, a heat exchanger, a compressor, a condenser, and an expansion element. The cooling circuit has an internal storage device connected to a high-pressure side of the cooling circuit upstream of the expansion element and downstream of the condenser and to a low-pressure side of the cooling circuit upstream of the compressor and downstream of the heat exchanger via a bypass of the cooling circuit. Thermal energy is stored and exchanged with the refrigerant through the internal storage device.

12 Claims, 1 Drawing Sheet

TEST CHAMBER AND METHOD

This application claims priority to European Patent Application No. 18178625.2 filed Jun. 19, 2018, which is incorporated herein by reference in its entirety.

The disclosure relates to a test chamber and to a method for conditioning air, comprising a test space which serves to receive test material and which can be closed off from the surroundings and which is temperature-insulated, and a temperature control device for controlling the temperature of the test space, the temperature control device allowing a temperature in a temperature range of −20° C. to +180° C. to be established within the test space, the temperature control device having a cooling device comprising a cooling circuit with a refrigerant, a heat exchanger, a compressor, a condenser, and an expansion element.

Test chambers of this kind are typically used to test physical and/or chemical properties of objects and of devices, in particular. For instance, temperature test cabinets or climate test cabinets within which temperatures in a range of −20° C. to +180° C. can be set are known. In climate test cabinets, desired climatic conditions can additionally be set, to which the device or the test material is then exposed for a defined period of time. Test chambers of this kind are typically or partially configured as mobile devices, which are connected to a building merely via the required supply lines and comprise all modules required for temperature control and air conditioning. Temperature control of a test space holding the test material to be tested typically takes place in a circulating air duct within the test space. The circulating air duct forms an air treatment space within the test space, in which heat exchangers for heating or cooling the air flowing through the circulating air duct and through the test space are disposed. A fan or ventilator aspirates the air located in the test space and leads it to the respective heat exchangers in the circulating air duct or vice-versa. In this way, the test material can be temperature-controlled or can be exposed to a defined temperature change. During a test interval, a temperature may repeatedly change between a maximum temperature and a minimum temperature of the test chamber, for example. A test chamber of this kind is known from EP 0 344 397 A2, for example.

Given the high demands placed on a temperature control within the temperature range of the test space, a load requirement regularly varies during operation of the test chamber. Hence, a cooling capacity generated by the compressor and the expansion element has to be controllable continuously. Likewise, it is desirable for the compressor to not be switched on and off all too often in order to prolong the service life of the compressor. This requirement is often solved by a bypass, which comprises a controllable expansion element and via which cooling capacity can be recycled past the heat exchanger, being established between a high-pressure side and a low-pressure side of the cooling circuit. With this as-needed distribution of a mass flow generated in the cooling circuit by the compressor, even small temperature differences between a current temperature and a target temperature can be equalized at the heat exchanger without the occurrence of unfavorable loads at the compressor. There is the disadvantage, however, that if a small temperature difference exists at the heat exchanger, the compressor will always have to be operated no matter how great the temperature difference to be equalized by the cooling device. For instance, in the case of a required cooling of <1% of a total capacity, the full cooling capacity of the compressor has to be provided in order to be able to maintain the required target temperature at the heat exchanger. A majority of the cooling capacity will be recycled to the compressor via the bypass. Since the compressor cannot be switched on and off repeatedly and a ventilator may have to be operated at the condenser, the known operating mode described here will result in relatively high energy consumption of the cooling device even in the case of very small temperature differences to be equalized.

Therefore, the object of the present disclosure is to provide a test chamber and a method for conditioning air in a test space of a test chamber by means of which the test chamber can be operated in an energy-saving manner.

Said object is attained by a test chamber having the features of claim 1 and by a method having the features of claim 14.

The test chamber for conditioning air according to the disclosure comprises a test space which serves to receive test material and which can be closed off from the surroundings and which is temperature-insulated, and a temperature control device for controlling the temperature of the test material, the temperature control device allowing a temperature in a temperature range of −20° C. to +180° C. to be established within the test space, the temperature control device having a cooling device comprising a cooling circuit with a refrigerant, a heat exchanger, a compressor, a condenser, and an expansion element, wherein the cooling circuit has an internal storage device, the internal storage device being connected to a high-pressure side of the cooling circuit upstream of the expansion element and downstream of the condenser in a flow direction via a bypass of the cooling circuit and to a low-pressure side of the cooling circuit upstream of the compressor and downstream of the heat exchanger in a flow direction, wherein thermal energy can be stored and exchanged with the refrigerant by means of the internal storage device.

In this context, the term thermal energy refers to the heat energy or the heat content in Joule, a supply of heat increasing a thermal energy and a dissipation of heat reducing it. In this way, the internal storage device of the disclosure can also store thermal energy in such a manner that a cooling capacity can be stored by dissipation of heat.

In the case of the test chamber according to the disclosure, a heat exchange with the surroundings of the test space is largely avoided by temperature-insulation of side walls, bottom walls and ceiling walls. The heat exchanger is connected to or integrated in the cooling circuit, refrigerant circulating in the cooling circuit thus flowing through the heat exchanger. The heat exchanger of the cooling circuit can be disposed within the test space or, more precisely, in an air treatment space of the test space or, alternatively, coupled to another cooling circuit of the cooling device if the cooling device has two cascaded cooling circuits. In this case, the heat exchanger serves as a condenser for the other cooling circuit. The cooling device further comprises the compressor and the condenser for the compressed refrigerant, the condenser being disposed downstream of the compressor in the flow direction of the refrigerant. The compressed refrigerant, which is highly pressurized after having been compressed and which is substantially gaseous, condenses in the condenser, whereafter it is substantially in the liquid state. The liquid refrigerant flows across the expansion element, in the course of which it becomes gaseous again by expansion due to a pressure drop. While doing so, it flows through the heat exchanger, which is thus cooled. Thereafter, the gaseous refrigerant is aspirated and compressed by the compressor again. The term expansion element refers to at least an expansion valve, a throttle, a throttle valve or another suitable narrowing of a fluid duct.

According to the present disclosure, the internal storage device is connected or integrated in the cooling circuit between the high-pressure side and the low-pressure side upstream of the expansion element and downstream of the condenser and upstream of the compressor and downstream of the heat exchanger in a flow direction via the bypass. In the event that only little cooling capacity is needed at the heat exchanger, the refrigerant or the respective mass flow of compressed refrigerant can be diverted from the high-pressure side into the internal storage device and be recycled to the compressor. The thermal energy inherent to the compressed refrigerant of the high-pressure side can be transferred to the internal storage device or thermal energy can be withdrawn from the internal storage device in such a manner that cold capacity is stored in the internal storage device. Accordingly, the internal storage device can be cooled or be supplied with cold capacity instead of the heat exchanger. Said cold capacity can be recycled to the low-pressure side again by means of the refrigerant, which allows the compressor to be switched off early. When the compressor is switched off, gaseous refrigerant located upstream of the compressor in the flow direction on the low-pressure side can flow via the bypass and the internal storage device, wherein the refrigerant can be condensed in the internal storage device owing to the cold capacity or low thermal energy stored there. With the density of the refrigerant increased by condensation, a pressure on the low-pressure side of the cooling circuit drops. Since a condensation pressure of the expansion element has changed only marginally after the compressor has been switched off, a pressure difference at the expansion element persists and can be used to cool the heat exchanger. The substantial aspect is that early switch-off of the compressor and of a ventilator, if present, becomes possible in this way, while a target temperature at the heat exchanger can still be maintained for a certain period of time or a temperature difference can be compensated. The cold capacity generated by the compressor and not required can be intermittently stored in the internal storage device and be transferred again by condensation of the refrigerant. Owing to the thus reduced runtimes of the compressor, the test chamber can be operated in a particularly energy-saving manner.

The internal storage device can be composed of an internal heat exchanger and a controllable second expansion element, wherein the second expansion element can be disposed between the high-pressure side and the internal heat exchanger in the bypass. This also allows liquid refrigerant from the high-pressure side to be evaporated via the second expansion element in such a manner that the refrigerant can be discharged as needed and be reintroduced into the internal heat exchanger again in the gaseous state due to a pressure drop, the internal heat exchanger thus being cooled. The gaseous refrigerant exiting the internal heat exchanger will have a higher temperature because of the cold capacity transferred in the internal heat exchanger and can be recycled to the compressor.

The internal heat exchanger can be formed by a plate heat exchanger whose secondary side can be filled with a storage fluid. For example, the storage fluid can be a phase change material (PCM), a saline solution or a gas liquefiable in the temperature range, such as carbon dioxide. The secondary side can be provided with suitable means that can compensate a pressure rise or drop by changing the density of the storage fluid.

A second bypass having at least a controllable third expansion element can be formed in the cooling circuit, wherein the second bypass can be connected to the high-pressure side upstream of the expansion element and downstream of the condenser in the flow direction and to the low-pressure side upstream of the compressor and downstream of the heat exchanger in the flow direction, wherein refrigerant can be supplied to the low-pressure side from the third expansion element, wherein the second bypass and the third expansion element can form a controllable internal additional cooling system. Via the second bypass or the third expansion element, refrigerant can be metered in such a manner that a suction-gas temperature and/or a suction-gas pressure of the refrigerant can be controlled upstream of the compressor on a low-pressure side of the cooling circuit. In this way, the compressor can be prevented from potentially overheating and thus becoming damaged, for example. Consequently, gaseous refrigerant located upstream of the compressor can be cooled via the second bypass by actuating the third expansion element and adding a metered amount of refrigerant that is still liquid. The third expansion element can be actuated by means of a controller which is coupled to a pressure and/or temperature sensor in the cooling circuit upstream of the compressor. It is particularly advantageous if a suction-gas temperature of $\leq 30°$ C., preferably $\leq 40°$ C., can be set via the second bypass. Refrigerant can be led past the internal storage device via the third bypass in order to delay automatic switch-off of the compressor or to prolong an operating time of the compressor, for example. Furthermore, it also becomes possible to dynamically supply the internal storage device with refrigerant or, depending on the load case at hand, to introduce excess liquid refrigerant not needed to cool a suction gas temperature into the internal storage device during operation of the compressor.

Another bypass comprising at least another controllable expansion element can be formed in the cooling circuit, wherein the other bypass can be connected to the high-pressure side downstream of the compressor and upstream of the condenser in the flow direction and to the low-pressure side upstream of the compressor and downstream of the heat exchanger in the flow direction, wherein refrigerant can be supplied to the low-pressure side from the other expansion element, wherein the other bypass and the other expansion element can form a re-injection device for refrigerant. In this way, hot gaseous refrigerant can be recycled from the high-pressure side downstream of the compressor to the low-pressure side upstream of the compressor. It may be provided for the other bypass to be connected directly to the bypass adjacent to the internal storage device. This allows an increase in the cold capacity or thermal energy stored in the internal heat exchanger to be achieved. The refrigerant can then continue to be overheated downstream of the internal heat exchanger with the aid of the other bypass or of the re-injection device, which can form what is referred to as a hot gas bypass, enabling flooded operation of the internal heat exchanger during normal operation of the compressor, said increase in efficiency allowing the internal heat exchanger or the internal storage device to be cooled even faster. As a result, an operating time of the compressor can be shortened further.

According to an alternative embodiment, another bypass comprising at least another controllable expansion element can be formed in the cooling circuit, wherein the other bypass can be connected to the high-pressure side downstream of the compressor and upstream of the condenser in the flow direction and to the internal storage device between the second expansion element and the internal heat exchanger, wherein refrigerant can be supplied to the internal heat exchanger from the other expansion element, wherein the other bypass and the other expansion element can form a re-injection device for refrigerant. After recondensation of refrigerant in the internal heat exchanger on the low-pressure side, the compressor has to be put into operation again if the recondensation can no longer take place because of a rising temperature in the internal heat exchanger. Because of the resulting drop in vapor pressure, the refrigerant in the internal heat exchanger evaporates and a flow direction of the refrigerant in the internal heat exchanger changes. It would be disadvantageous if refrigerant re-condensed in the internal heat exchanger would be aspirated by the compressor. This can be prevented by the other bypass or the thus formed re-injection device introducing hot gaseous refrigerant into the internal heat exchanger, thus allowing the liquid refrigerant accumulated in the internal heat exchanger to be pre-evaporated.

It is particularly advantageous if a suction gas temperature and/or a suction gas pressure of the refrigerant on the low-pressure side of the cooling circuit can be controlled upstream of the compressor, and/or that a pressure difference between the high-pressure side and the low-pressure side of the cooling circuit can be equalized. In this way, the compressor can be prevented from potentially overheating and thus becoming damaged. It is particularly advantageous if a suction gas temperature of ≤30° C., preferably ≤40° C., can be set. Also, the refrigerant can be metered such that an operating time of the compressor can be controlled. It is generally disadvantageous if the compressor is turned on and off repeatedly. A service life of a compressor can be prolonged if the compressor is in operation over longer periods of time. It is also possible in that case to turn the compressor off for longer periods of time.

The temperature control device can comprise a control device having at least a pressure sensor and/or at least a temperature sensor in the cooling circuit, wherein magnetic valves of expansion elements can be actuatable by means of the control unit as a function of a measured temperature or pressure. The control unit can comprise means for data processing which process data sets from sensors and control the magnetic valves. In this case, a function of the cooling device can also be adjusted to the refrigerant used via a corresponding computer program, for example. Furthermore, the control unit can signal a malfunction and, if necessary, initiate a shut-down of the test chamber in order to protect the test chamber or the test material from being damaged by critical or undesired states of operation of the test chamber.

If the expansion element is realized as a throttle comprising a magnetic valve, refrigerant can be metered via the throttle and the magnetic valve. In this case, the throttle can be an adjustable valve or a capillary via which refrigerant is routed by means of the magnetic valve. The magnetic valve itself can be actuated using the control unit.

By means of the temperature control device, a temperature in a temperature range of −40° C. to +180° C., preferably −70° C. to +180° C., can be established within the test space. The substantial aspect is that a temperature in a temperature range of >+60° C. to +180° C. within the test space can be reduced by means of the temperature control device. The refrigerant in the heat exchanger is heated strongly by the relatively high temperature in the test space, which is why, at least on a low-pressure side of the cooling circuit, the cooling circuit can be technically adjusted in terms of its construction to a refrigerant heated in this temperature range. Otherwise, a refrigerant heated in this manner can no longer be optimally used on the low-pressure side of the cooling circuit.

In an embodiment of the test chamber, the heat exchanger can be disposed in the test space. Also, the heat exchanger can be disposed in an air treatment space of the test space, allowing air circulated by a ventilator to come into contact with the heat exchanger. As a result, an amount of circulated air of the test space can be cooled directly in the test space by means of the cooling device via the heat exchanger.

In this way, the cooling device can have only the one cooling circuit. The single cooling circuit of the test chamber can be connected directly to the test space. Also, it is possible for a minimum achievable temperature in the test space to not be lower than −20° C. in this case.

In another embodiment of the test chamber, the heat exchanger can form a cascade heat exchanger for another cooling circuit of the cooling device. Accordingly, the test chamber can have at least two cooling circuits, in which case the cooling circuit forms a first stage of the cooling device and another cooling circuit, which is connected directly to the test space, forms a second stage of the cooling device. The cascade heat exchanger or the heat exchanger also serves as a condenser for the other cooling circuit. Thus, in this embodiment of a test chamber, it becomes possible to establish particularly low temperatures in the test space. The other cooling circuit can have another refrigerant, another compressor, another heat exchanger, another condenser and another expansion element, wherein the other heat exchanger can be disposed in the test space, wherein the other cooling circuit can be coupled to the cascade heat exchanger of the cooling circuit by means of the other cooling circuit. In this case, the cooling device has two series-connected circuits which form what is referred to as a cooling cascade. Each of the two cooling circuits can also have an internal storage device as described above.

The temperature control device can have a heating device comprising a heater and a heating heat exchanger in the test space. For example, the heating device can be an electrical resistance heater heating the heating heat exchanger in such a manner that the temperature in the test space can be increased via the heating heat exchanger. If the heat exchanger and the heating heat exchanger can be specifically controlled to cool or heat the air circulated in the test space by means of a control unit, a temperature in the temperature ranges indicated above can be established within the test space by means of the temperature control device. Irrespective of the test material or of an operating state of the test material, a temperature constancy over time of ±1 K, preferably ±0.3 K to ±0.5 K, can be established in the test space during a test interval. The term test interval refers to a time segment of a full test period in which the test material is exposed to a substantially constant temperature or climatic condition. The heating heat exchanger can be combined with the heat exchanger of the cooling circuit in such a manner that a shared heat exchanger body through which the refrigerant can flow and which has heating elements of an electrical resistance heater is formed. The condenser can be cooled by air or water or by another cooling fluid. In principle, the condenser can be cooled with any suitable fluid. The substantial point is that the thermal load occurring at the condenser is dissipated via cooling air or cooling water in such a manner that the refrigerant can condense until it is completely liquefied.

In the method according to the disclosure for conditioning air in a test space of a test chamber which serves to receive test material and which can be closed off from the surroundings and which is temperature-insulated, a cooling device of a temperature control device of the test chamber comprising a cooling circuit, a refrigerant, a heat exchanger, a compressor, a condenser and an expansion element is used to establish a temperature in a temperature range of −20° C. to +180° C. within the test space, thermal energy being stored and exchanged with the refrigerant by means of an internal storage device of the cooling circuit which is connected to a high-pressure side of the cooling circuit upstream of the expansion element and downstream of the condenser in a flow direction and to a low-pressure side of the cooling circuit upstream of the compressor and downstream of the heat exchanger in a flow direction via a bypass of the cooling circuit.

Regarding the advantages of the method according to the disclosure, reference is made to the description of advantages of the device according to the disclosure. Overall, a thermal efficiency of the cooling device can be increased, whereby substantial amounts of energy can be saved. Without operating the compressor, the heat exchanger can be cooled via the expansion element for a relatively long period of time. In addition to switching off the compressor, it is also possible to switch off other components of the cooling device, such as a ventilator of the condenser, or to switch off a water cooling system if the condenser is water-cooled. Moreover, the cooling device can be controlled more precisely when the compressor is switched off because the compressor does not disturb the pressure and temperature conditions in the cooling circuit.

The refrigerant can be led from the high-pressure side to the low-pressure side via the internal storage device. When the compressor is in operation, the refrigerant can be led from the high-pressure side to the low-pressure side, and when the compressor is switched off, the refrigerant can flow from the low-pressure side into the internal storage device. The refrigerant can thus change flow direction in the bypass depending on whether the internal storage device is storing or transferring thermal energy.

In a first step, liquid refrigerant from the high-pressure side can be expanded into gaseous refrigerant by means of the internal storage device and be led to the low-pressure side.

The compressor can then be operated in such a manner that the refrigerant is evaporated by means of a controllable second expansion element and is led through an internal heat exchanger of the internal storage device, wherein thermal energy can be transferred from a storage fluid of the internal heat exchanger to the refrigerant.

Subsequently, in a second step, gaseous refrigerant from the low-pressure side can be condensed into liquid refrigerant by means of the internal storage device. This is conditional on the internal storage device being cool enough or storing little enough thermal energy for the gaseous refrigerant to be able to condense. In this context, it may be provided for the internal storage device to be cooled until a substantial temperature difference can be achieved by said cooling.

By condensing the refrigerant in the internal storage device, a pressure difference can be established between the low-pressure side and the high-pressure side. The internal storage device can then be used as a cold sink.

So the compressor can be switched off and the refrigerant can be led into an internal heat exchanger of the internal storage device and be condensed, wherein thermal energy can be transferred from the refrigerant to a storage fluid of the internal heat exchanger. This exchange of thermal energy from the refrigerant to the storage fluid reheats the storage fluid and cools the refrigerant, which causes the refrigerant to condense. This process can be performed until a temperature difference between the storage fluid and the refrigerant makes condensation of the refrigerant in the internal heat exchanger impossible or until the internal heat exchanger is filled with liquid refrigerant. Then the compressor can be operated again.

Other embodiments of the method are apparent from the description of features of the claims depending on device claim 1.

Hereinafter, preferred embodiments of the disclosure will be explained in more detail with reference to the accompanying drawings.

Figure 1:
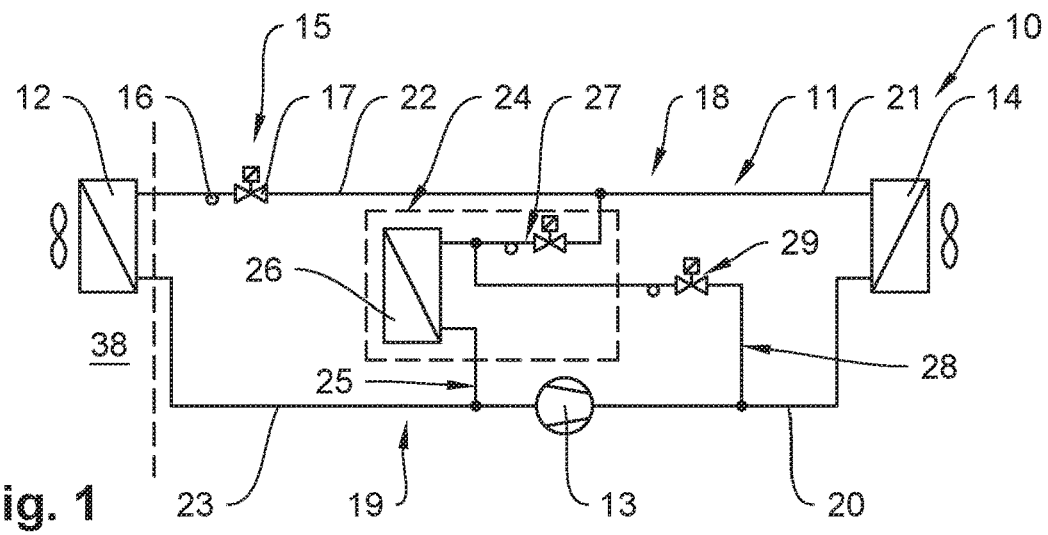
FIG. 1 is a schematic illustration of an embodiment of a cooling device.

FIG. 1 shows a schematic illustration of a cooling device 10 including a cooling circuit 11, within which a refrigerant can circulate. Furthermore, the cooling device 10 comprises a heat exchanger 12 which is disposed in a test space 38, which is hinted at in the drawings, or in another cooling circuit (not shown), a compressor 13, a condenser 14 and an expansion element 15. The expansion element 15 is composed of a throttle 16 and a magnetic valve 17. The cooling circuit 11 has a high-pressure side 18, which extends from the compressor 13 to the expansion element 15 in the flow direction of the refrigerant, and a low-pressure side 19, which extends from the expansion element 15 to the compressor 13. In a pipe section 20 from the compressor 13 to the condenser 14, the refrigerant is gaseous and has a relatively high temperature. The refrigerant compressed by the compressor 13 flows in the cooling circuit 11 toward the condenser 14, the gaseous refrigerant being liquefied in the condenser 14. In the flow direction of the refrigerant in the cooling circuit 11, the condenser 14 is followed by the expansion element 15, the refrigerant thus being in the liquid state in a pipe section 21 of the cooling circuit 11 between the condenser 14 and the expansion element 15. By expansion of the refrigerant downstream of the expansion element 15, the heat exchanger 12 is cooled, the refrigerant transitioning into the gaseous state in a pipe section 22 between the expansion element 15 and the heat exchanger 12 and being led from the heat exchanger 12 to the compressor 13 by way of a pipe section 23.

In the cooling circuit 11, an internal storage device 24 is furthermore connected to the high-pressure side 18 upstream of the expansion element 15 and downstream of the condenser 14 in a flow direction and to the low-pressure side 19 upstream of the compressor 13 and downstream of the heat exchanger 12 in a flow direction via a bypass 25 of the cooling circuit 11. Thermal energy can be stored and exchanged with the refrigerant by means of the internal storage device 24. The internal storage device 24 is composed of an internal heat exchanger 26 and a controllable second expansion element 27. The second expansion element 27 is disposed in the bypass 25 between the high-pressure side 18 and the internal heat exchanger 26. When the compressor 14 is being operated and little cold capacity is required at the heat exchanger 12, a control unit (not shown) of the test chamber is used to expand the refrigerant by means of the second expansion element 27 and to lead it through the internal heat exchanger 26 of the internal storage device 24. The internal heat exchanger 26 has a storage fluid (not shown) which transfers thermal energy to the refrigerant in such a manner that the storage fluid is cooled. When it is no longer possible to achieve a substantial temperature difference by cooling the storage fluid, the compressor 13 is switched off and the refrigerant is led from the low-pressure side 19 into the internal heat exchanger 26. The refrigerant condenses in the internal heat exchanger 26, thermal energy being transferred from the refrigerant to the storage fluid. This process can be continued until the storage fluid is heated far enough that the refrigerant does not condense or until the internal heat exchanger 26 is filled. By condensing and accumulating the refrigerant, the density of the refrigerant is increased and a pressure on the low-pressure side 19 is reduced. This reduction again causes a pressure difference at the expansion element 15, which can be used to expand refrigerant via the heat exchanger 12. Subsequently, the compressor 13 can be operated again, an ensuing reduced pressure causing the refrigerant in the internal heat exchanger 26 to evaporate.

Furthermore, another bypass 28 comprising another controllable expansion element 29 is disposed in the cooling circuit 11, the other bypass 28 being connected to the high-pressure side 18 downstream of the compressor 13 and upstream of the condenser 14 in the flow direction and to the internal storage device 24 between the second expansion element 27 and the internal heat exchanger 26. Thus, hot and gaseous refrigerant from the high-pressure side 18 can be introduced into the internal heat exchanger 26 via the other expansion element 29. Also, aspiration of liquid refrigerant located in the internal heat internal heat exchanger 26 can be prevented during start of the compressor 13 if the refrigerant is mixed with the hot gaseous refrigerant.

Figure 2:
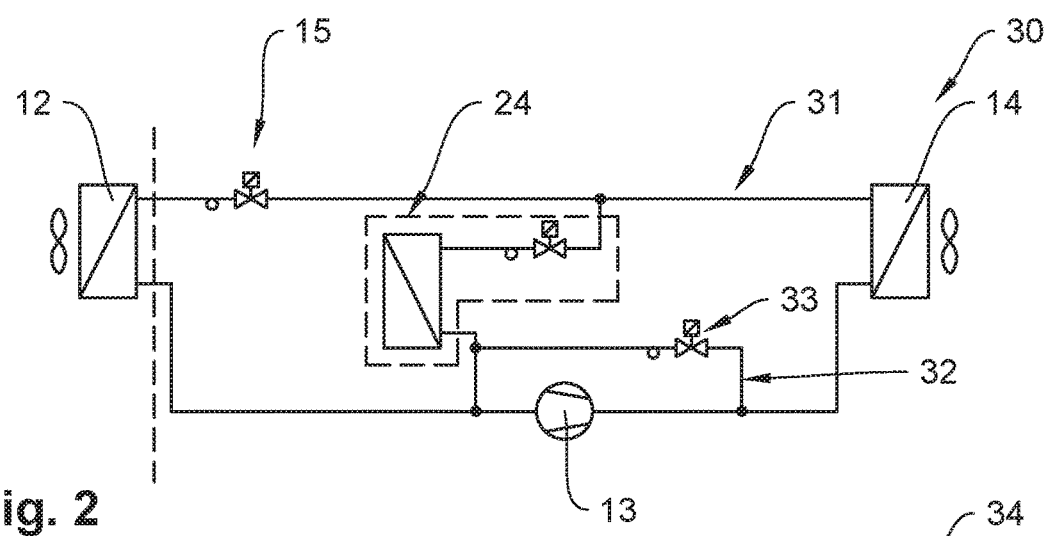
FIG. 2 is a schematic illustration of a second embodiment of a cooling device.

FIG. 2 shows a cooling device 30 comprising a cooling circuit 31, cooling device 30 differing from the cooling device of the cooing circuit 31 shown in FIG. 1 in that it has another bypass 32 comprising another controllable expansion element 33, the other bypass 32 being connected to the high-pressure side 18 downstream of the compressor 13 and upstream of the condenser 14 in the flow direction and to the low-pressure side 19 upstream of the compressor 13 and downstream of the heat exchanger 12 in the flow direction. This allows hot and gaseous refrigerant to be recycled from the high-pressure side 18 to the low-pressure side 19 upstream of the compressor 13, whereby a suction gas temperature and/or a suction gas pressure of the refrigerant on the low-pressure side 19 becomes controllable. Furthermore, a pressure difference between the high-pressure side 18 and the low-pressure side 19 can be equalized. Control of the suction gas temperature is advantageous in particular if refrigerant is expanded by means of the internal heat exchanger 26.

Figure 3:
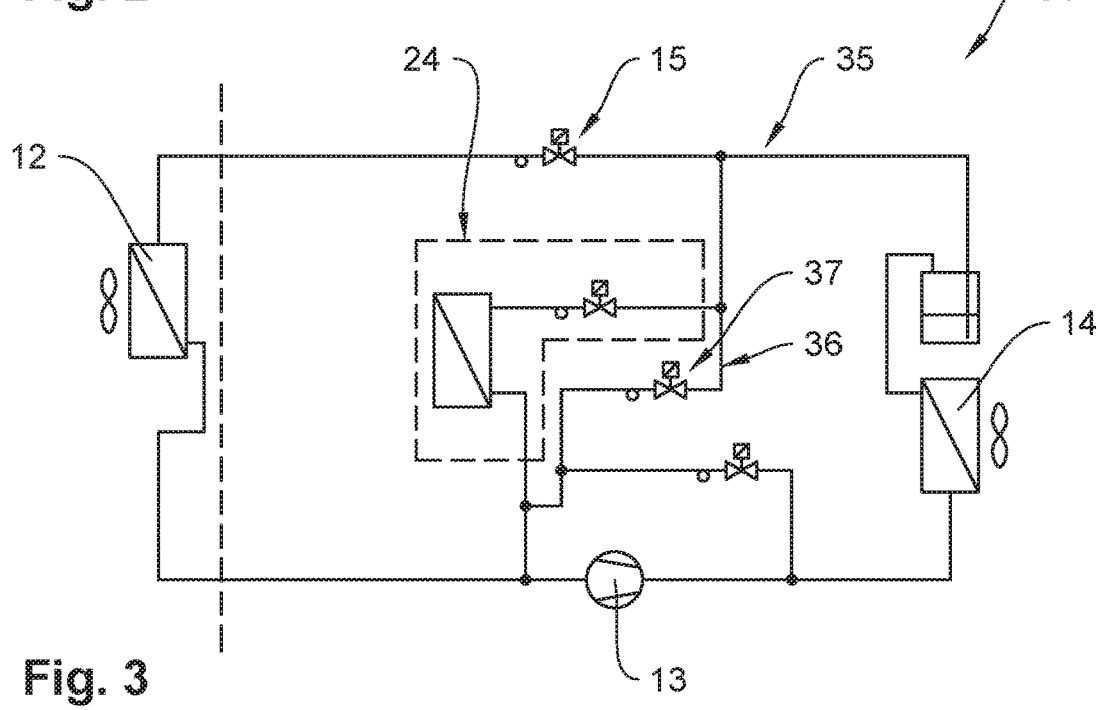
FIG. 3 is a schematic illustration of a third embodiment of a cooling device.

FIG. 3 shows another cooling device 34 comprising a cooling circuit 35, cooling device 34 differing from the cooling device of FIG. 2 in that it has a second bypass 36. The second bypass 36 is provided with a controllable third expansion element 27, the second bypass 36 being connected to the high-pressure side 18 upstream of the expansion element 15 and downstream of the condenser 14 in the flow direction and to the low-pressure side 19 upstream of the compressor 13 and downstream of the heat exchanger 12 in the flow direction. Refrigerant can be supplied to the low-pressure side 19 by means of the third expansion element 37, again allowing the refrigerant to be expanded and a suction gas temperature to be reduced or controlled upstream of the compressor 13.

REFERENCE SIGNS

10 cooling device
11 cooling circuit
12 heat exchanger
13 compressor
14 condenser
15 expansion element
16 throttle
17 magnetic valve
18 high-pressure side
19 low-pressure side
20 pipe section
21 pipe section
22 pipe section
23 pipe section
24 internal storage device
25 bypass
26 internal heat exchanger
27 second expansion element
28 other bypass
29 other expansion element
30 cooling device
31 cooling circuit
32 other bypass
33 other expansion element
34 cooling device
35 cooling circuit
36 second bypass
37 third expansion element
38 test space

The invention claimed is:

1. A test chamber for conditioning air, comprising a test space which serves to receive test material and which can be closed off from the surroundings and which is temperature-insulated, and a temperature control device for controlling the temperature of the test space, the temperature control device allowing a temperature in a temperature range of −20° C. to +180° C. to be established within the test space, the temperature control device having a cooling device comprising a cooling circuit with a refrigerant, a heat exchanger, a compressor, a condenser, and an expansion element, wherein the cooling circuit has an internal storage device, the internal storage device being connected to a high-pressure side of the cooling circuit upstream of the expansion element and downstream of the condenser in a flow direction and to a low-pressure side of the cooling circuit upstream of the compressor and downstream of the heat exchanger via a bypass of the cooling circuit, thermal energy being stored and exchanged with the refrigerant by an internal heat exchanger of the internal storage device, wherein the internal storage device is composed of the internal heat exchanger and a controllable second expansion element, the second expansion element being disposed between the high-pressure side and the internal heat exchanger in the bypass, and wherein the internal heat exchanger is formed by a plate heat exchanger wherein a secondary side of the plate exchanger is filled with a storage fluid.

2. The test chamber according to claim 1, wherein a second bypass-having at least a controllable third expansion element is formed in the cooling circuit, the second bypass being connected to the high-pressure side upstream of the expansion element and downstream of the condenser in the flow direction and to the low-pressure side upstream of the compressor and downstream of the heat exchanger in the flow direction refrigerant being supplied to the low-pressure side from the third expansion element, the second bypass and the third expansion element forming a controllable internal additional cooling system.

3. The test chamber according to claim 1, wherein another bypass-having at least another controllable expansion element is formed in the cooling circuit, the other bypass being connected to the high-pressure side downstream of the compressor and upstream of the condenser in the flow direction and to the internal storage device between the second expansion element and the internal heat exchanger, refrigerant being supplied to the internal heat exchanger from the other expansion element, the other bypass and the other expansion element forming a re-injection device for refrigerant.

4. The test chamber according to claim 1, wherein a suction gas temperature and/or a suction gas pressure of the refrigerant is controlled upstream of the compressor on the low-pressure side of the cooling circuit and/or that a pressure difference between the high-pressure side and the low-pressure side of the cooling circuit is equalized.

5. The test chamber according to claim 1, wherein the temperature control device comprises a control unit having at least a pressure sensor and/or at least a temperature sensor in the cooling circuit, magnetic valves being actuated by means of the control unit as a function of a measured temperature and/or pressure.

6. The test chamber according to claim 1, wherein the heat exchanger is disposed in the test space.

7. The test chamber according to claim 1, wherein the cooling device has only the one cooling circuit.

8. A test chamber for conditioning air, comprising a test space which serves to receive test material and which can be closed off from the surroundings and which is temperature-insulated, and a temperature control device for controlling the temperature of the test space, the temperature control device allowing a temperature in a temperature range of −20° C. to +180° C. to be established within the test space, the temperature control device having a cooling device comprising a cooling circuit with a refrigerant, a heat exchanger, a compressor, a condenser, and an expansion element, wherein the cooling circuit has an internal storage device, the internal storage device being connected to a high-pressure side of the cooling circuit upstream of the expansion element and downstream of the condenser in a flow direction and to a low-pressure side of the cooling circuit upstream of the compressor and downstream of the heat exchanger via a bypass of the cooling circuit, thermal energy being stored and exchanged with the refrigerant by an internal heat exchanger of the internal storage device, wherein the internal storage device is composed of the internal heat exchanger and a controllable second expansion element, the second expansion element being disposed between the high-pressure side and the internal heat exchanger in the bypass, and wherein another bypass having at least another controllable expansion element is formed in the cooling circuit, the other bypass being connected to the high-pressure side downstream of the compressor and upstream of the condenser in the flow direction and to the low-pressure side upstream of the compressor and downstream of the heat exchanger in the flow direction, refrigerant being supplied to the low-pressure side from the other expansion element, the other bypass and the other expansion element forming a re-injection device for refrigerant.

9. A method for conditioning air in a test space of a test chamber which serves to receive test material and which can be closed off from the surroundings and which is temperature-insulated, a temperature . . . being established within the test space by a temperature control device of the test chamber having a cooling device comprising a cooling circuit with refrigerant, a heat exchanger, a compressor, a condenser, and an expansion element, wherein thermal energy is stored and exchanged with the refrigerant by an internal heat exchanger of an internal storage device, the internal storage device is composed of the internal heat exchanger and a controllable second expansion element of the cooling circuit connected to a high-pressure side of the cooling circuit upstream of the expansion element and downstream of the condenser in a flow direction and to a low-pressure side of the cooling circuit upstream of the compressor and downstream of the heat exchanger in a flow direction via a bypass of the cooling circuit, wherein the refrigerant is led from the high-pressure side to the low-pressure side via the internal storage device, gaseous refrigerant from the low-pressure side is condensed into liquid refrigerant by an internal heat exchanger of the internal storage device, and wherein the compressor is switched off and the refrigerant is led into the internal heat exchanger of the internal storage device and condensed, thermal energy being transferred from the refrigerant to a storage fluid of the internal heat exchanger.

10. The method according to claim 9 wherein, in a first step, liquid refrigerant from the high-pressure side is expanded into gaseous refrigerant by means of the internal storage device and led to the low-pressure side.

11. The method according to claim 10, wherein the compressor is operated and the refrigerant is evaporated by the controllable second expansion element and is led through the internal heat exchanger of the internal storage device, thermal energy being transferred from a storage fluid of the internal heat exchanger to the refrigerant.

12. The method according to claim 9, wherein by condensing the refrigerant in the internal storage device, a pressure difference is established between the low-pressure side and the high-pressure side.

* * * * *

UNITED STATES PATENT AND TRADEMARK OFFICE
CERTIFICATE OF CORRECTION

| | |
|---|---|
| PATENT NO. | : 11,187,632 B2 |
| APPLICATION NO. | : 16/442719 |
| DATED | : November 30, 2021 |
| INVENTOR(S) | : Christian Haack et al. |

It is certified that error appears in the above-identified patent and that said Letters Patent is hereby corrected as shown below:

In the Claims

Column 12, Claim 9, Line 12, "temperature . . . being" should be --temperature in a temperature range of -20° C. to +180° C. being--.

Signed and Sealed this
Twenty-second Day of November, 2022

Katherine Kelly Vidal
*Director of the United States Patent and Trademark Office*